United States Patent [19]
Kluger

[11] 4,197,928
[45] Apr. 15, 1980

[54] BRAKE SHOE GUIDE AND WHEEL CYLINDER RETAINER FOR A DRUM BRAKE

[75] Inventor: Michael A. Kluger, South Bend, Ind.

[73] Assignee: The Bendix Corporation, Southfield, Mich.

[21] Appl. No.: 922,129

[22] Filed: Jul. 5, 1978

[51] Int. Cl.² ............................................. F16D 71/00
[52] U.S. Cl. ................................. 188/206 A; 188/341
[58] Field of Search ........... 188/335, 340, 341, 206 A, 188/206 R

[56] References Cited
U.S. PATENT DOCUMENTS

| | | | |
|---|---|---|---|
| 3,016,112 | 1/1962 | Helvern | 188/341 X |
| 3,114,438 | 12/1963 | Helvern | 188/340 X |
| 3,279,570 | 10/1966 | Parks | 188/206 A |

FOREIGN PATENT DOCUMENTS 1464623  11/1966  France ...................................... 188/341

Primary Examiner—Duane A. Reger
Attorney, Agent, or Firm—Paul D. Schoenle; Ken C. Decker

[57] ABSTRACT

A drum brake assembly includes a backing plate which supports a pair of brake shoes and a hydraulic actuator cooperates with the pair of brake shoes to move the latter to a braking position. An anchor pin extends from the backing plate to oppose torque developed by the pair of brake shoes during braking. In order to align the pair of brake shoes with the hydraulic actuator, a single clip is carried by the anchor pin and the clip opposes axial movement between the backing plate and the pair of brake shoes opposes separation between the backing plate and the hydraulic actuator. In an alternative embodiment the single clip forms a hook at one end to releasably engage the backing plate.

7 Claims, 3 Drawing Figures

BRAKE SHOE GUIDE AND WHEEL CYLINDER RETAINER FOR A DRUM BRAKE

BACKGROUND OF THE INVENTION

A drum brake assembly generally includes an anchor pin for absorbing torque developed by a pair of brake shoes and a flange is supported on the anchor pin by retraction springs to prevent the pair of brake shoes from separating from the backing plate and also to guide radial expansion of the pair of brake shoes during braking. In addition, a wheel cylinder is received within an opening on the backing plate and secured to the latter by bolts or a suitable latch. Such a drum brake assembly requires separate parts for securing the wheel cylinder to the backing plate and guiding the radial expansion of the pair of brake shoes.

SUMMARY OF THE INVENTION

The present invention covers an improvement in the prior art drum brake assemby and, in particular, provides a single clip which integrates the two-fold objectives of securing the wheel cylinder to the backing plate and guiding the radial expansion of the pair of brake shoes. The clip comprises a substantially T-shaped plate which is supported by the anchor pin. A retraction spring or washer prevents the clip from separating from the anchor pin and a pair of arm portions are engageable with the pair of brake shoes to guide the radial expansion of the latter. Moreover, a leg extending transversely to the arm portions is engageable with the wheel cylinder to secure the latter to the backing plate.

An alternative embodiment provides a hook on the end of the leg and an opening or slot in the backing plate receives the hook to releasably interlock the clip thereto provided the clip remains supported on the anchor pin.

It is a primary object of the present invention to provide a single clip which guides the radial expansion of the pair of brake shoes so as to prevent separation between the pair of brake shoes and the backing plate, and which also is engageable with the wheel cylinder to secure the same to the backing plate.

DETAILED DESCRIPTION

Figure 1:
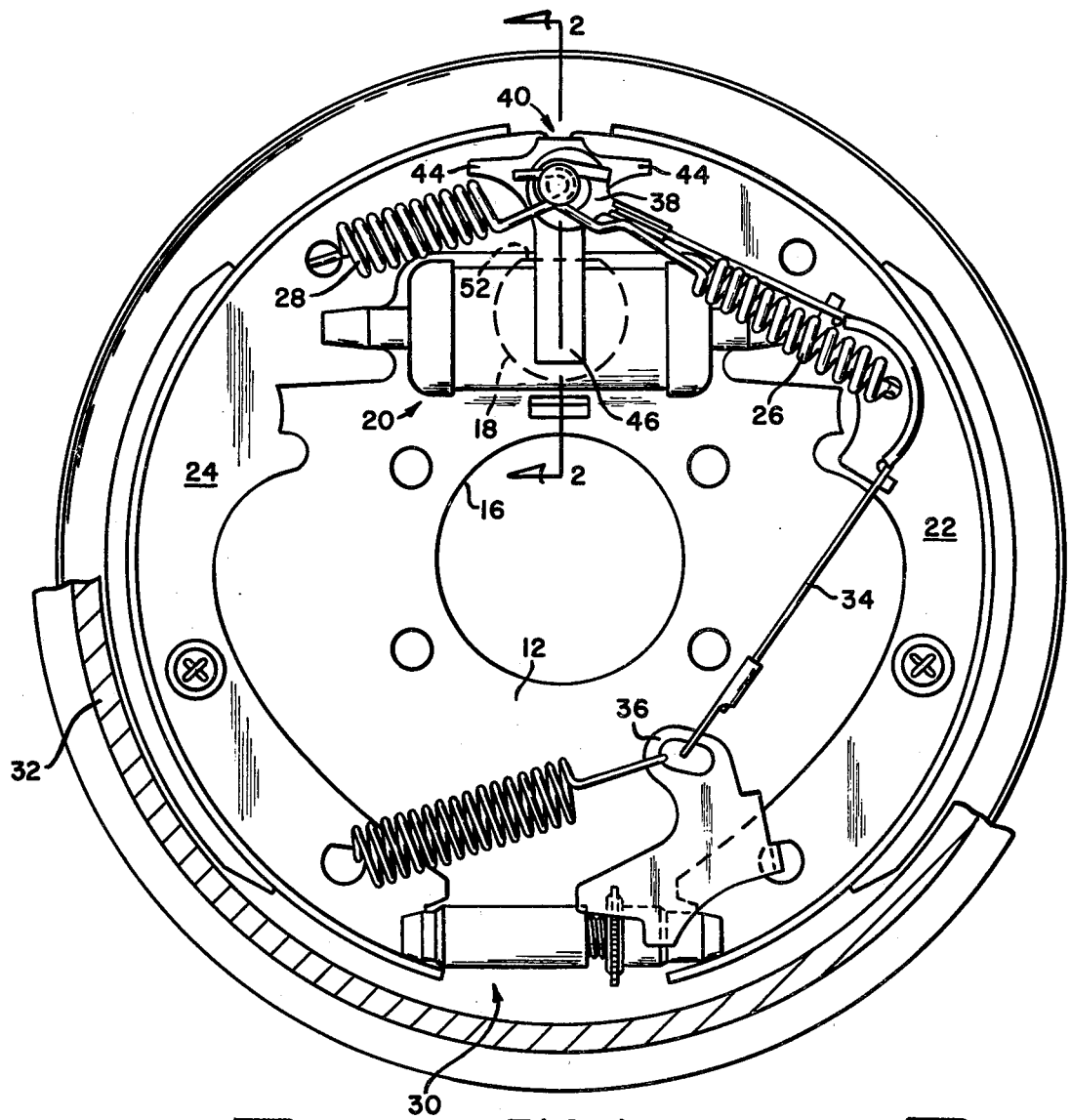
FIG. 1 is a front view of a conventional drum brake assembly utilizing the clip design of the present invention.

The drum brake assembly of FIG. 1 includes a backing plate 12 which supports an anchor pin 14 and includes an opening 16 for receiving an axle shaft (not shown). Another opening 18 on the backing plate 12 receives a portion of a wheel cylinder or hydraulic actuator 20.

In a conventional manner a pair of brake shoes 22 and 24 are resiliently coupled to the anchor pin by retraction springs 26 and 28 which extend from the anchor pin 14 to a respective brake shoe. An adjuster assembly 30 is disposed between the pair of brake shoes opposite the hydraulic actuator 20 and is operable to maintain a small clearance between the pair of brake shoes and a drum 32 to take up wear of the pair of brake shoes. An adjuster cable 34 extends from a pawl 36 to the anchor pin 14 and terminates in a washer 38.

In accordance with the invention a clip 40 is apertured at 42 to fit on the anchor pin 14. The clip forms aligning arm portions 44 and a transversely extending leg 46. The arm portions are slidably engageable with the pair of brake shoes adjacent the anchor pin 14 to provide a guide for the radial expansion of the pair of brake shoes during braking and also to limit separation or axial walking of the latter relative to the backing plate.

Figure 2:
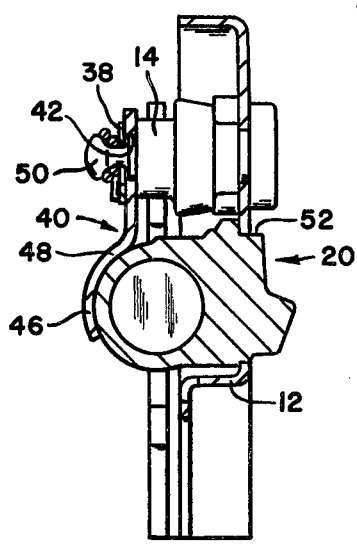
FIG. 2 is a partial cross-sectional view taken along 2—2 of FIG. 1.

Turning to FIG. 2 it is seen that the leg 46 is deformed at 48 to match the outer surface of the hydraulic actuator 20. With the washer 38 and the retraction springs 26 and 28 coupled to the anchor pin 14 and in abutment with the enlarged head 50, the clip 40 is prevented from separating from the anchor pin 14. Moreover, the diameter of the washer 38 is sufficient to prevent pivoting of the clip 40 in a plane perpendicular to the backing plate 12. Consequently, the clip 40 is engageable with the hydraulic actuator 20 via the deformed portion 48 to limit separation of the hydraulic actuator away from the backing plate 12. Moreover, the opening 18 and the hydraulic actuator 20 are suitably keyed at 52 to prevent rotation of the hydraulic actuator 20 within the opening 18.

Figure 3:
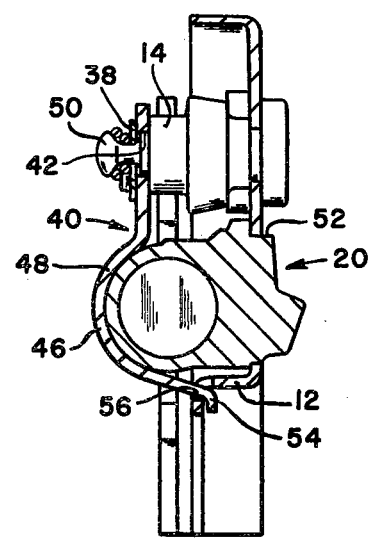
FIG. 3 is a partial cross-sectional view similar to FIG. 2 and showing an alternative embodiment.

Turning to the embodiment of FIG. 3 wherein like reference numerals refer to similar parts, the leg 46 is formed with a hook 54 and an aperture 56 is provided on the backing plate 12 for receiving the hook 54. Consequently, the clip 40 of FIG. 3 is releasably interlocked with the backing plate as well as secured at the anchor pin 14. With this embodiment the clip 40 is assembled to the drum brake assembly by inserting the hook 54 in the aperture 56 before fitting the clip 40 on the anchor pin 14.

With respect to both embodiments, the single clip 40 performs the two functions of guiding the radial expansion of the pair of brake shoes 22 and 24 while at the same time securing the hydraulic actuator 20 to the backing plate.

I claim:

1. In a drum brake assembly having a pair of brake shoes which are movable by a hydraulic actuator to a braking position and a backing plate supporting the hydraulic actuator and including an anchor pin abutting the pair of brake shoes, the improvement wherein a clip cooperates with the anchor pin to limit separation between the pair of brake shoes and the backing plate and said clip also cooperates with the hydraulic actuator to retain the latter in engagement with the backing plate.

2. In a drum brake assembly having a pair of brake shoes which are movable by a hydraulic actuator to a braking position and a backing plate supporting the hydraulic actuator and including an anchor pin abutting the pair of brake shoes, the improvement wherein a clip cooperates with the anchor pin to limit separation between the pair of brake shoes and the backing plate, said clip also cooperating with the hydraulic actuator to retain the latter in engagement with the backing plate, said clip comprising a substantially T-shaped plate with the coaxial arms of the T-shaped plate limiting axial movement between the pair of brake shoes and the backing plate and the transverse leg of the T-shaped plate being engageable with the hydraulic actuator to retain the latter in engagement with the backing plate.

3. The drum brake of claim 1 in which said clip is resiliently engageable with the hydraulic actuator to oppose separation between the hydraulic actuator and the backing plate.

4. In a drum brake assembly having a pair of brake shoes which are movable by a hydraulic actuator to a braking position and a backing plate supporting the hydraulic actuator and including an anchor pin abutting the pair of brake shoes, the improvement wherein a clip cooperates with the anchor pin to limit separation between the pair of brake shoes and the backing plate, said clip also cooperating with the hydraulic actuator to retain the latter in engagement with the backing plate, and said clip includes an end remote from the anchor pin which releasably interlocks with the backing plate.

5. In a drum brake assembly having a backing plate which supports a pair of friction elements, a hydraulic actuator which is engageable with the pair of friction elements to move the latter to a braking position and an anchor pin extending from the backing plate and opposing torque transferred by the pair of brake shoes during braking, the improvements wherein a single clip cooperates with the pair of brake shoes and the hydraulic actuator to align the pair of brake shoes with the hydraulic actuator and said clip limits axial movement between the backing plate and the pair of brake shoes and is engageable with the hydraulic actuator to retain the hydraulic actuator in engagement with the backing plate.

6. In a drum brake assembly having a backing plate which supports a pair of friction elements, a hydraulic actuator which is engageable with the pair of friction elements to move the latter to a braking position and an anchor pin extending from the backing plate and opposing torque transferred by the pair of brake shoes during braking, the improvements wherein a single clip cooperates with the pair of brake shoes and the hydraulic actuator to align the pair of brake shoes with the hydraulic actuator, said clip limiting axial movement between the backing plate and the pair of brakes and opposing separation between the backing plate and the hydraulic actuator, and said single clip including an end which releasably interlocks with the backing plate.

7. A clip for use with a pair of brake shoes and a backing plate in a drum brake assembly comprising a plate having portions limiting movement of the pair of brake shoes in the drum brake assembly and having a leg which is capable of engaging a hydraulic actuator in the drum brake assembly to secure the hydraulic actuator thereto, said leg forming a hook releasably engaging the backing plate to secure the hydraulic actuator to the backing plate.

* * * * *